Aug. 23, 1932.   D. ADAMS   1,873,248
LAMINATED GLASS AND PROCESS FOR PRODUCING THE SAME
Filed May 14, 1928   3 Sheets-Sheet 3

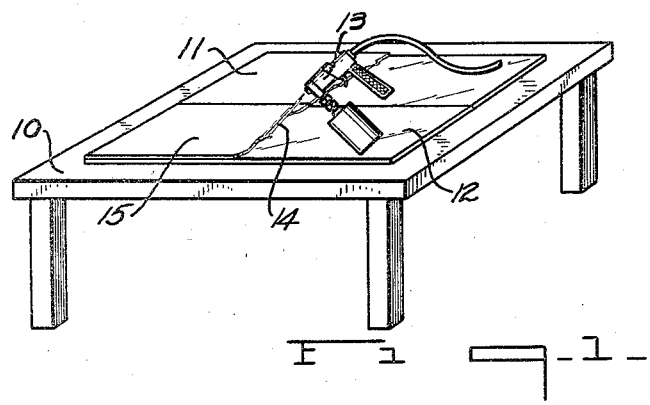
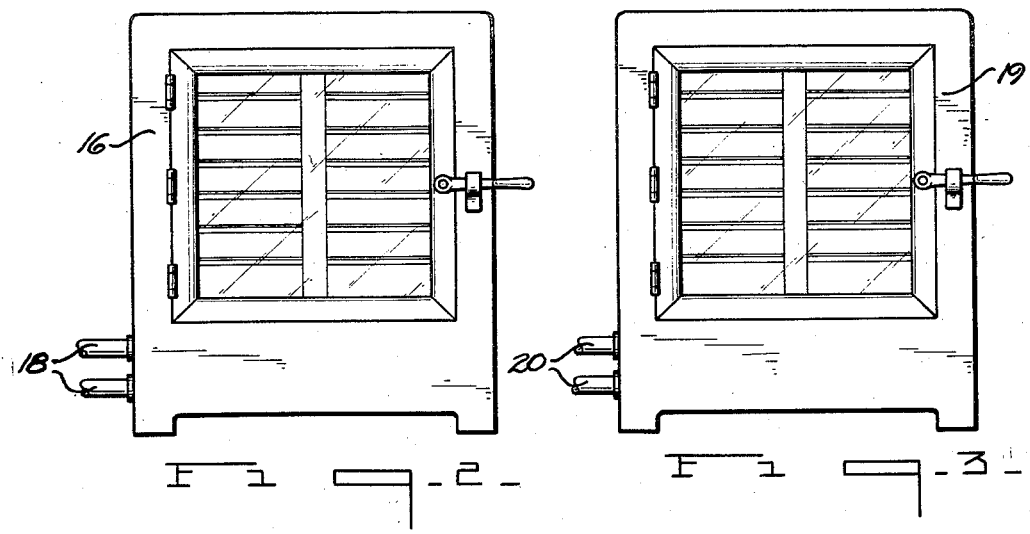
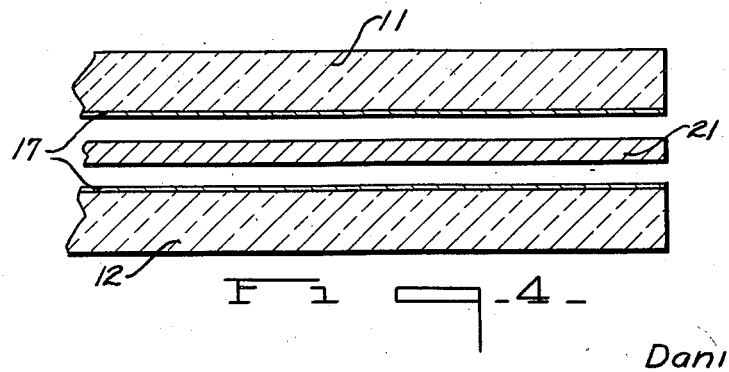

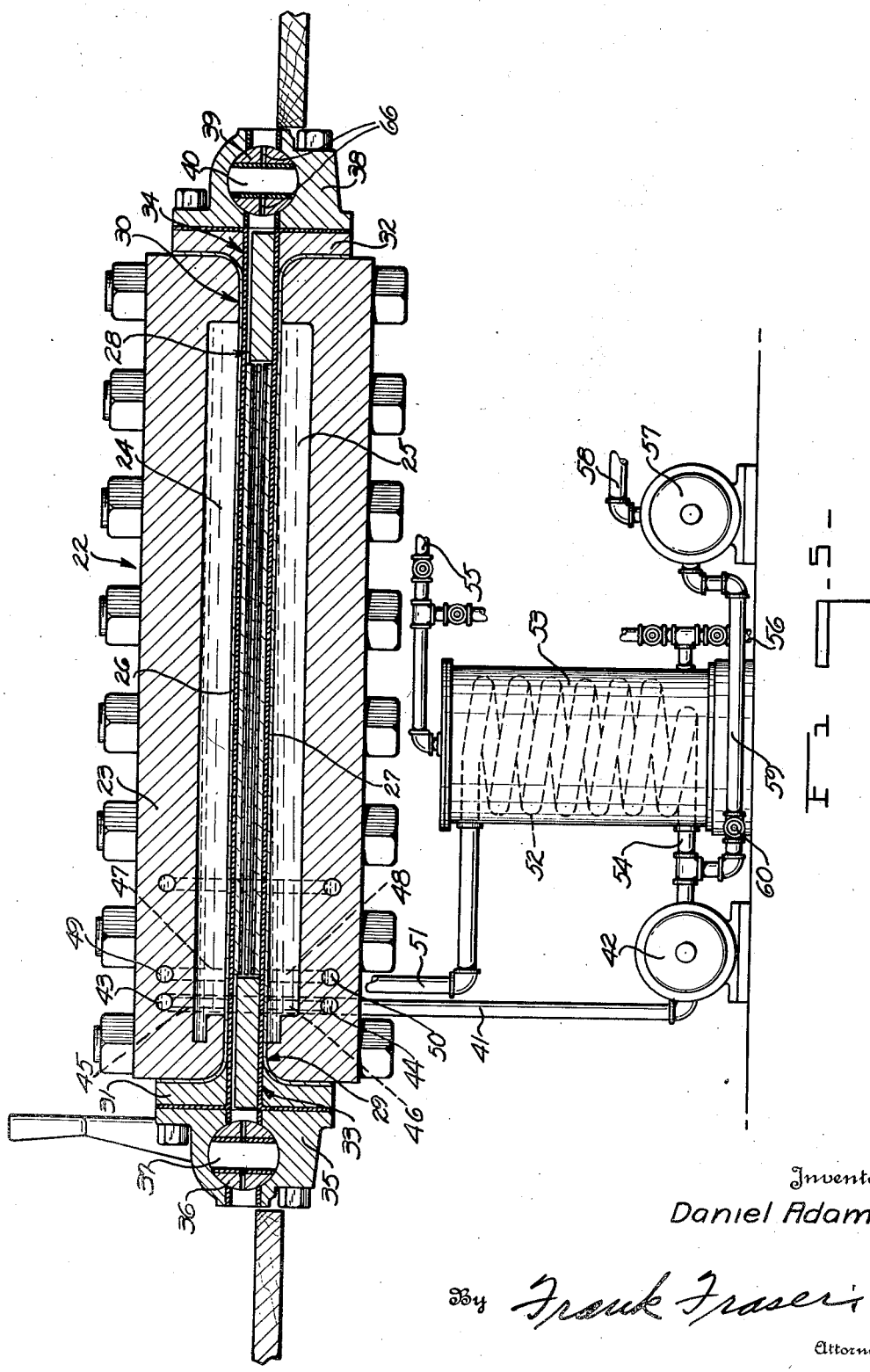

Inventor
Daniel Adams
By Frank Fraser
Attorney

Patented Aug. 23, 1932

1,873,248

UNITED STATES PATENT OFFICE

DANIEL ADAMS, OF ANN ARBOR, MICHIGAN, ASSIGNOR TO LIBBEY-OWENS-FORD GLASS COMPANY, OF TOLEDO, OHIO, A CORPORATION OF OHIO

LAMINATED GLASS AND PROCESS FOR PRODUCING THE SAME

Application filed May 14, 1928. Serial No. 277,413.

The present invention relates to laminated glass and the process for producing the same.

Composite or laminated glass ordinarily comprises two or more sheets of glass with a layer or layers of non-brittle material such as celluloid, cellulose composition material or the like interposed therebetween. The glass sheets and interposed layer or layers of non-brittle material are preferably assembled in superimposed relation with a coating of some suitable cement or bonding material applied to the adjacent faces thereof, heat being applied to the assembled sheets in a manner serving to soften the bonding material and secure adhesion of the sheets when pressure is applied thereto.

Ordinarily, unless special precaution is taken, a certain amount of air may be trapped between the laminations during the assembling of the sheets and when this occurs and pressure is applied to the sheets, the air acts as a spacing medium to prevent proper adhesion and union of the sheets. The presence of air between the laminations may cause the formation of bubbles or the like in the finished product. These bubbles indicate that portions of the sheets are not properly united and they therefore not only mar the appearance of the finished sheet but render the sheet undesirable because it does not offer the protective qualities of a properly made sheet.

The general object of the present invention is to provide an improved process for producing laminated glass wherein the presence of air between the laminations during the joining or uniting operation will be eliminated or at least greatly reduced so that the several laminations may be intimately united with one another throughout their entire area whereby to produce a laminated sheet of good appearance as well as one having the proper protective qualities.

Another object of the invention is to provide a process for producing laminated glass wherein the glass sheets to be used are each provided upon one surface thereof with a skin or film of some suitable bonding material of a character, or containing a suitable ingredient, solution or mixture, either incorporated in the bonding material at the time of making the same or subsequently applied to the skin or film, which will be converted into vapor or steam upon the application of heat to the assembled sheets of material whereby to effect the removal of any trapped air from between the assembled laminations prior to the joining or uniting thereof.

Another object of the invention is to provide a process for producing as a new article of manufacture, a sheet of laminated glass wherein one side each of two sheets of glass is provided with a coating or skin of gelatin or gelatin composition after which a sheet of plastic material is interposed between the two gelatin surfaces and the sandwich thus formed pressed together to form a composite structure.

Another object of the invention is to provide such a process wherein the skin or film of gelatin formed on one side each of the two sheets of glass is allowed to dry to the desired extent after which the gelation skins or films are exposed to a saturated or well humidified atmosphere so that they will absorb a desired amount of moisture, the sheets being then removed from this atmosphere and a sheet of non-brittle material interposed between the gelatin surfaces and the laminations joined together by the action of heat and pressure.

A still further object of the invention is to provide such a process wherein a gelatin skin is formed on one surface each of two sheets of glass, the gelatin skins being adapted to contain an excess of water, a sheet of cellulose composition material being interposed between the gelatin surfaces and the assembled sheets of material then preheated to cause the excess of water in the gelatin skins to be converted into steam, the steam tending to chase or eject from between the laminations any air which might have been trapped therebetween during the assembling of the sheets, after which the laminations are pressed or joined together.

Other objects and advantages of the invention will become more apparent during the course of the following description when taken in connection with the accompanying drawings.

In the drawings forming a part of this application and wherein like numerals are employed to designate like parts throughout the same, Fig. 1 represents diagrammatically the formation of the gelatin coatings on the glass sheets.

Fig. 2 represents a drying cabinet in which the gelatin coated sheets may be placed.

Fig. 3 represents a humidifying cabinet in which the glass sheets may be placed after being removed from the drying cabinet.

Fig. 4 is a sectional view illustrating the laminations before they are united.

Fig. 5 is a longitudinal vertical sectional view through one type of press showing the assembled laminations therein.

Figure 6:
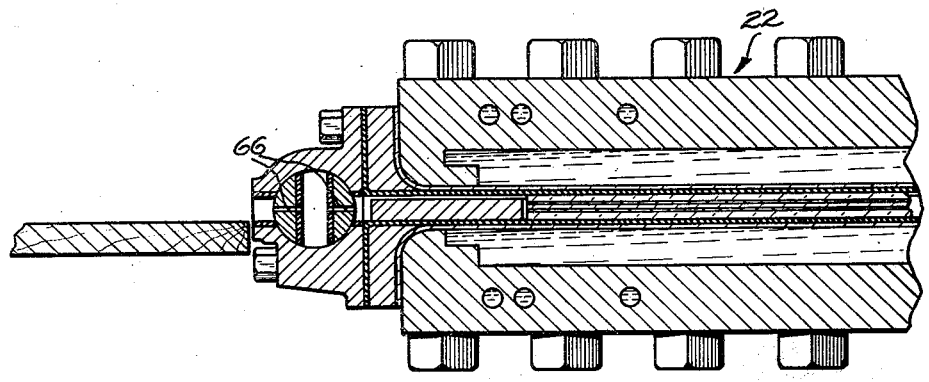
Fig. 6 is a fragmentary sectional view of one end of the press showing the laminations united.

Briefly stated, one way in which the process provided by the present invention may be practiced is as follows: The sheets of glass to be used, which are ordinarily two in number, are first preferably chemically cleaned after which a coating or deposit of gelatin or gelatin composition is placed upon one surface each of the two sheets of glass. The coated sheets of glass are then placed within a drying atmosphere and allowed to dry for a desired length of time, the gelatin coating forming a skin or film upon the glass sheets. The sheets are then removed from the drying atmosphere and exposed to a saturated or well humidified atmosphere wherein the gelatin skins or films are adapted to absorb an excess of water. The glass sheets are then removed from the humidifying atmosphere and assembled with a sheet of non-brittle material placed therebetween and in contact with the gelatin skins. The assembled sandwich is then placed within a suitable press and heated without any pressure being applied thereto, the heat being such that the excess water previously absorbed by the gelatin skins will be converted into steam and this steam will tend to chase or eject any air which might be trapped between the laminations outwardly from therebetween. Pressure is then applied to the assembled sheets of material to effect the union thereof and when this is done, the excess steam will condense into water, which water will be absorbed by the gelatin skins. With this process, it is possible to produce a laminated sheet of glass wherein the glass sheets will be firmly united to the interposed sheet of non-brittle material throughout their entire area so that the formation of bubbles or weak spots in the laminated sheet due to the presence of trapped air between the laminations during the pressing operation will be eliminated or at least greatly reduced.

While the method of procedure outlined above is directed to the use of a skin of gelatin or gelatin composition having an excess of water which is adapted to be subsequently converted into steam, the present invention is not necessarily restricted to the use of such a skin but also contemplates the use of any kind of bonding material of a character, or containing a suitable ingredient, solution or mixture which will vaporize upon the application of heat to the assembled sheets of material to be joined and which vapor will effect the removal of any trapped air from between the laminations. This vaporous ingredient, mixture or solution may be incorporated in the bonding material during the making thereof or may be subsequently applied to the skin or film formed therefrom.

In the event that a skin of gelatin or gelatin composition is to be used, the sheets of glass are adapted to first be chemically cleaned since it will be readily understood that the slightest trace of grease, dirt or other foreign matter upon the glass sheets will have an injurious effect on the finished product. The surfaces of the glass sheets may or may not be ground and polished as desired. In most cases, it will be necessary to chemically clean only one surface of each sheet of glass, that surface being the one upon which the gelatin skin or film is adapted to be formed.

In Fig. 1 is illustrated a table or other suitable support 10 upon which may be arranged two sheets of glass 11 and 12, the two sheets being preferably placed with adjacent edges in contact with one another as shown. A spray gun or other suitable means 13 may be used to apply a gelatin solution 14 upon the sheets of glass, thus forming a deposit or coating 15 thereon. The upper exposed surfaces of the glass sheets 11 and 12, and upon which the gelatin coating 15 is formed, are the surfaces of these two sheets which have been previously chemically cleaned. The gelatin solution may be of any desired composition made in any preferred manner.

After the gelatin coating or deposit 15 has been formed on the glass sheets 11 and 12, the coated sheets may be placed in a drying cabinet 16, being supported therein upon racks which engage the sheets preferably at the edges thereof only. Of course, the coated surfaces of the glass sheets face upwardly so that no part of this surface will contact with the racks. The gelatin coating is allowed to dry to the desired extent and as the coating or deposit 15 dries, it forms a skin or film 17 upon the glass sheet as shown in Fig. 4. Conduits 18 may be associated with the cabinet to properly control the temperature thereof.

After the gelatin coating has been allowed to dry for the desired length of time, the glass sheets are removed from the drying chamber and may then be placed in a humidifying chamber 19 containing a saturated or well humidified atmosphere. The humidity within the cabinet 19 may be accurately controlled by means of conduits 20. The glass sheets are permitted to remain within the humidifying cabinet 19 for a sufficient length of time to allow the gelatin skins or films to absorb the desired amount of moisture, or in other words, until an excess of water is added to the gelatin.

After the gelatin skins have been properly treated, the glass sheets are assembled as shown in Fig. 4 with the gelatin skins 17 facing one another, a sheet of non-brittle material 21 of celluloid, cellulose composition material or the like being interposed between the glass sheets so as to contact with the skins of gelatin. The assembled laminations or "sandwich" may then be placed within a press shown in Fig. 5 and designated in its entirety by the numeral 22. Any type of press may of course be used, the press herein shown being illustrated simply for the purposes of illustration and in itself forming no part of the present invention.

The press herein illustrated comprises a housing 23 having formed therein upper and lower pressure chambers 24 and 25 facing one another. Seated across the open faces of the pressure chambers are the resilient diaphragms 26 and 27 maintained spaced from one another to provide the compartment 28 therebetween within which compartment is adapted to be placed the assembled sheets of material to be joined. The opposite ends of the diaphragms extend through slots 29 and 30 in the opposite ends of the housing and are laterally turned in opposite directions as shown and clamped between the end walls of the housing and the clamping plates 31 and 32 having slots 33 and 34 therein adapted to register with the compartment 28.

Arranged outwardly of and secured to the clamping plate 31 is a valve member 35 having a rotatable core 36 provided with a transverse slot 37 and which slot, when disposed in a horizontal position, is adapted to register with the slot 33 in clamping plate 31. Secured to the clamping plate 32 at the opposite end of the housing is a similar valve member 38 provided with a core 39 having a transverse slot 40 adapted, when disposed in a horizontal position, to register with the slot 34 in clamping plate 32. Thus, when the slots 37 and 40 of the valve members 36 and 39 are disposed in a horizontal position, the compartment 28 between the diaphragms is readily accessible from both ends of the housing. The assembled sheets of material to be joined are adapted to be placed within the compartment 28 through one end of the housing and after being united are adapted to be removed from the opposite end thereof, this being accomplished in any suitable manner. During the joining or pressing operation, the valve members 36 and 39 are rotated so as to close the opposite ends of the compartment as shown in Fig. 5.

A suitable liquid is adapted to circulate through the pressure chambers 24 and 25. The means for circulating this liquid includes an inlet pipe 41 leading from the circulating or service pump 42 and communicating with the upper and lower pressure chambers through conduits 43 and 44 and passages 45 and 46. After circulating through the pressure chambers, the liquid is adapted to pass outwardly thereof through the passages 47 and 48 into the conduits 49 and 50 and thence to the main outlet pipe 51. The outer end of the outlet pipe 51 is connected with a coil 52 arranged within a heating tank 53, the opposite end of the coil being connected with the circulating pump 42 by means of pipe 54.

The steam or other heating media employed for heating the tank 53 is adapted to pass into the tank through the inlet pipe 55 and then outwardly thereof through the outlet pipe 56. Upon operation of the service or circulating pump 42, the liquid will be forced through the inlet pipe 41 into the pressure chambers 24 and 25 above and beneath the diaphragms 26 and 27, the liquid circulating through the pressure chambers and then passing outwardly thereof through the outlet pipe 51, through the coil 52 and pipe 54 back to the pump 42.

The apparatus is also equipped with a high pressure pump 57 so that after the heated liquid has been circulated through the pressure chambers for a suitable period of time, the pressure pump can be brought into operation to circulate the liquid through the chambers at a relatively high pressure, said pressure acting upon the diaphragms and the contents thereof to effect the union of the assembled sheets of material. The pressure pump 57 is in communication with a source of liquid supply through pipe 58 and also communicates with pipe 54 through pipe 59 having valve 60 therein. During the initial circulation of the liquid through the pressure chambers, the valve 60 is closed but when the pressure pump is brought into operation this valve is opened.

In carrying out the present invention, after the sheets of glass have been removed from the humidifying cabinet 19 and properly assembled with a sheet of non-brittle material interposed therebetween as shown in Fig. 4, they are placed within the compartment 28 of the press herein shown. The heated liquid is then circulated through the pressure chambers in a manner to cause a heating up of the assembled sheets of material, this heating action being sufficient to cause the excess water contained by the gelatin skins to be converted into steam. This heating of the sheets of material is accomplished without the application of any pressure thereto so that the steam will function to chase or eject any air which might be trapped between the laminations outwardly from therebetween and this air can pass from the compartment 28 through the air holes 66 in the rotatable cores 36 and 39 of the valve members 35 and 38. After the air has been removed from between the laminations pressure is adapted to be applied to the assembled sheets to cause the joining or uniting thereof. As the assembled sheets are pressed together, the excess steam will condense into water and this water will be absorbed by the gelatin skins. The pressure upon the sheets can be effected by bringing into operation the pressure pump 57.

As stated above, the present invention is not to be restricted to the use of a gelatin skin since other kinds of skins may be used with equal satisfaction. For example, skins of a character, or containing or having applied thereto a vaporous ingredient, solution or mixture may be employed, the vapor serving in the same manner as the steam above described to chase or eject any trapped air from between the laminations prior to the joining or uniting thereof. The excess vapor, like the excess steam, will be subsequently condensed and the water absorbed by the skins.

Figure 7:
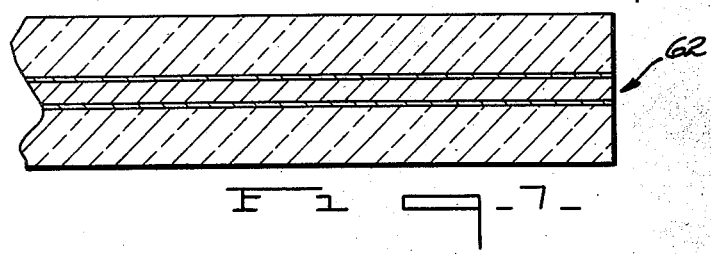
Fig. 7 is a fragmentary sectional view illustrating diagrammatically the finished sheet formed from the laminations illustrated in Fig. 4.
Figure 8:
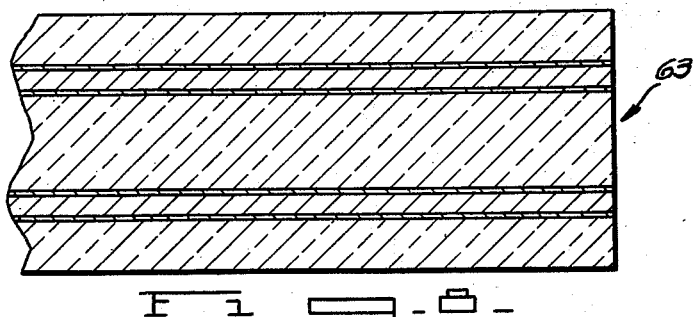
Fig. 8 is a similar view of another form of laminated sheet.
Figure 9:
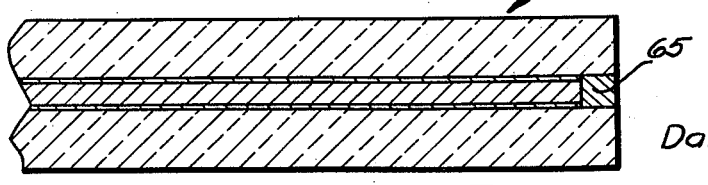
Fig. 9 is a view similar to Fig. 7 but showing the provision of luting or sealing for the edges of the laminated sheet.

Fig. 7 illustrates diagrammatically the finished sheet of glass 62 formed from the laminations comprising the sandwich shown in Fig. 4. In Fig. 8 is shown a somewhat different type of laminated sheet designated 63 and ordinarily termed "bullet-proof glass", while in Fig. 9 is shown a sheet 64 somewhat similar to the sheet 62 but with the edges thereof provided with a seal or lute 65.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing laminated glass, which consists in forming upon one side each of two sheets of glass an adhesive skin containing a vaporizable constituent, interposing a sheet of non-brittle material between the glass sheets in contact with the skins, heating the assembled sheets without applying any pressure thereto to a temperature sufficient to cause a vaporizing of the vaporizable constituent, and then applying a pressure of the sheets to effect the uniting thereof.

2. The process of producing laminated glass, which consists in forming upon one side each of two sheets of glass a gelatin skin containing an excess of water, interposing a sheet of non-brittle material between the glass sheets in contact with the gelatin skins, heating the assembled sheets of material without applying any pressure thereto to a temperature sufficient to convert the water contained by the gelatin skins into steam, and then pressing the sheets together.

3. The process of producing laminated glass, which consists in forming a gelatin skin on one side each of two sheets of glass, humidifying the gelatin skins, interposing a sheet of non-brittle material between the gelatin skins of the two sheets of glass, heating the assembled sheets of material without applying any pressure thereto to a temperature sufficient to convert any moisture contained by the gelatin skins into steam, and then pressing the sheets together.

4. The process of producing laminated glass, which consists in applying a coating of gelatin solution to one side each of two sheets of glass, drying each coating to form a skin of gelatin on each sheet of glass, subjecting the gelatin skins to a humidified atmosphere causing them to absorb an excess of water, interposing a sheet of non-brittle material between the gelatin skins of the two sheets of glass, heating the assembled sheets of material without applying any pressure thereto to a temperature sufficient to convert the water contained by the gelatin skins into steam, and then pressing the sheets together.

Signed at Toledo, in the county of Lucas and State of Ohio, this 9th day of May 1928.

DANIEL ADAMS.